2,885,092
SIDE BOOM FOR TRACTORS

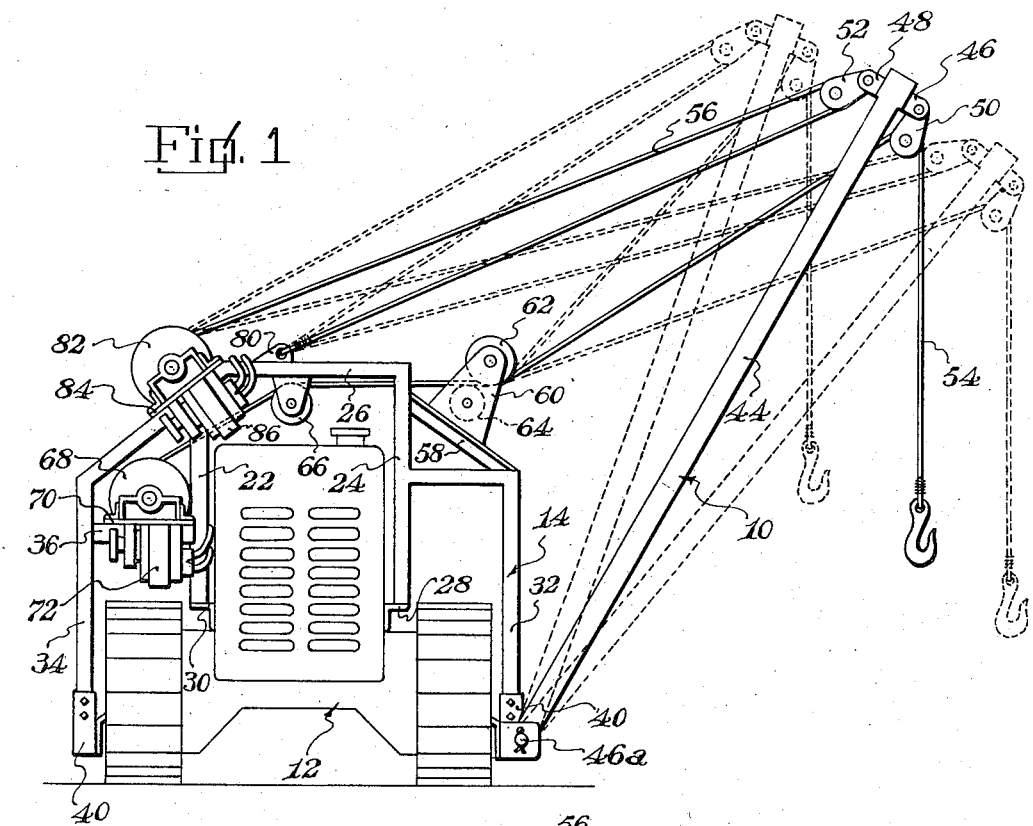
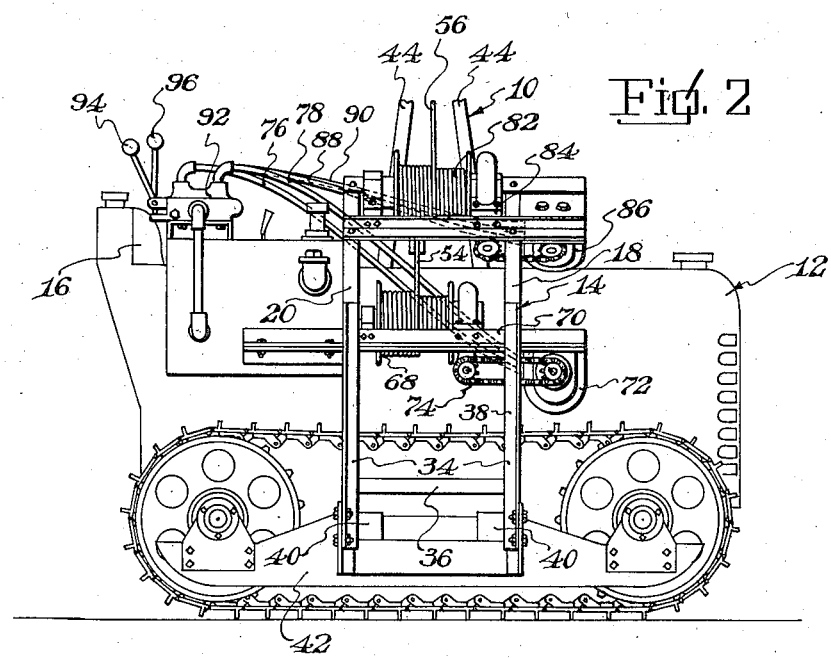

Orville E. Murrey, Tulsa, Okla.

Application January 3, 1956, Serial No. 556,947

1 Claim. (Cl. 212—8)

This invention relates to improvements in booms and is particularly directed to an improved boom structure for a tractor.

A primary object of the present invention is to provide a side boom structure for a tractor, the boom structure projecting laterally of the tractor and being movable vertically about an axis paralleling the longitudinal axis of the tractor.

Another important object of the present invention is to provide a simple, compact and inexpensive mounting and supporting structure for the boom, such mounting and supporting structure being easily installed on any conventional tractor, without extensive modification of the tractor and without interfering with ordinary use and operation of the tractor.

A further important object of the present invention is to provide compact operating means for the boom and a drag line carried thereby, such operating means being controlled by the operator of the tractor from his normal driving position.

A further important object of this invention is to provide a counterbalanced side boom structure for a tractor which can lift and lower any objects without interfering with the movement of the tractor or causing the tractor to tip over.

These and ancillary objects and structural features of merit are attained by this invention, the preferred form of which is set forth in the following description and illustrated in the accompanying drawing, wherein:

Figure 1 is a front elevational view of the novel boom construction of the present invention, showing the same mounted on a tractor which is shown in front elevation, and Figure 2 is a side elevational view of the novel boom construction showing the operating and control means therefor.

Referring now more particularly to the drawing, the numeral 10 generally designates the boom structure which is shown mounted on a conventional tractor 12, such tractor being representative of any make, model or size of tractor.

The boom structure includes a mounting and supporting frame 14 which is substantially U-shaped and fits over the tractor in front of the driver's seat 16. The frame 14 essentially consists of two longitudinally spaced frame sections 18 and 20, each of which is identically shaped and is of open ended rectangular form and includes parallel legs 22 and 24 and a straight web portion 26. The lower ends of the legs rest on the outstanding horizontal flanges 28 of angle irons 30 which are suitably secured to the sides of the tractor, as shown in Figure 1. The sections 18 and 20 are supported by depending angular legs 32 and 34 with suitable cross-braces 36 being provided. The lower ends of the straight, vertical portions 38 of such legs are bolted to brackets 40 which are suitably attached to the plates 42.

The entire frame 14 is composed of channel bars and angle irons and is so shaped and secured in position that it is arched over the tractor and securely anchored thereto, providing for an equalization of the load and avoiding any possibility of tilting the tractor when a load is carried by the boom.

An A boom 44 has the lower spread apart ends of its legs pivotally attached, as at 46a (Fig. 1), to the brackets 40 on one side of the tractor and the boom is vertically movable in a curvilinear path about such pivots, as shown in Figure 1. The boom 44 has oppositely extending brackets 46 and 48 on its upper end, to which brackets guide pulleys 50 and 52 are pivotally attached. The pulley 50 carries the winch or drag line 54, while the pulley 52 carries the boom line 56.

A portion 58 of one of the legs 32 has a pulley bracket 60 upstanding therefrom and the drag line 54 is guided between complementary sheaves 62 and 64 mounted on the bracket 60, which is offset at an angle from the vertical. The sheaves 62 and 64 guide the line 54 into a horizontal path and the line is further guided by a guide pulley 66 that depends from the web portion of the forward frame section 18.

A drag line winch 68 is mounted by a support 70 on the frame 14 and is positioned in a horizontal plane on the side of the tractor opposite to the boom. The winch 68 is mounted in suitable bearing supports for rotation about an axis paralleling the pivotal axis of the boom and the longitudinal axis of the tractor. A hydraulic motor 72 is carried by the support 70 and is operatively connected to the winch by a suitable chain, sprocket and gear drive transmission 74. The motor is supplied with hydraulic fluid by flexible lines 76 and 78, as will be described.

The boom line 56 is anchored at one end to an upstanding apertured ear 80 on the web portion of the forward frame section 18, while the other end is coiled on a hydraulically driven boom winch 82. The boom winch is mounted by a suitable supporting base 84 on the angular portions of the legs 32 and 34. The boom winch is positioned above and at an angle, inwardly toward the tractor, of the drag line winch 68. The boom winch rotates about an axis paralleling the axis of rotation of the drag line winch and is powered by a hydraulic motor 86, which is operated through lines 88 and 90.

The flexible fluid supply and return lines 76, 78 and 88, 90 are attached to a valve housing 92 which houses conventional flow valves (not shown) and which is in communication with the standard pump on the tractor. The housing 92 is located adjacent the driver's seat 16 so that the valve operating levers 94 and 96 can be operated by the driver from his seat, as he operates the tractor.

The side boom, as above described and shown in the drawing, is of particular value in the laying of pipes in trenches alongside a road and in many other jobs where the movement of the tractor parallel with a lifting and lowering task is required.

The placement of the winches and their motors in relation, on the frame 14, to the winch and the construction and particular mounting of the frame 14 on the tractor provide an equalization of the load so that the tractor cannot topple over.

It is believed that many other uses of the side boom will occur to those skilled in the art and that, since changes and modifications may be required, it is to be understood that the illustrated structure is merely the preferred embodiment.

What is claimed is:

In combination with a tractor having a driver's seat, a boom structure comprising a substantially U-shaped supporting frame disposed transversely over the tractor and secured thereto substantially forward of the driver's seat, a boom member pivotally secured to one side of the frame and extending laterally from one side of the tractor, said boom member vertically pivotal about an axis parallel to the longitudinal axis of the tractor, a drag line winch mounted on the opposite side of the frame, a drag line operated by the winch and carried by the boom, guide means secured to the frame for directing a portion of the drag line in a substantially horizontal path across the tractor in proximity of the driver's seat, a fluid operated motor for the winch mounted on the frame adjacent the winch, a boom line, pulley means pivotally secured to the boom for carrying the boom line, boom winch means secured to the frame in the proximity of the drag line winch for receiving one end of the boom line, means for anchoring the opposite end of the boom line to the frame adjacent the boom winch, said boom winch mounted on the frame in a position above the drag line winch, a second fluid operated motor secured to the frame adjacent the boom winch for operation thereof, and remote control means for the winches disposed rearwardly of the frame member and adjacent the driver's seat of the tractor, said frame member positioned on the tractor in a manner precluding interference with the normal operation of the tractor.

References Cited in the file of this patent

UNITED STATES PATENTS

| | | |
|---|---|---|
| 2,077,741 | Cardwell | Apr. 20, 1937 |
| 2,413,529 | Swaney | Dec. 31, 1946 |
| 2,425,663 | Wooldridge | Aug. 12, 1947 |
| 2,475,963 | Howell | July 12, 1949 |
| 2,722,320 | Dobeus et al. | Nov. 1, 1955 |